Sept. 5, 1961  TAKASHI OJI ET AL  2,998,749
APPARATUS FOR FOCUSING A PROCESS CAMERA OR THE LIKE
Filed July 14, 1959
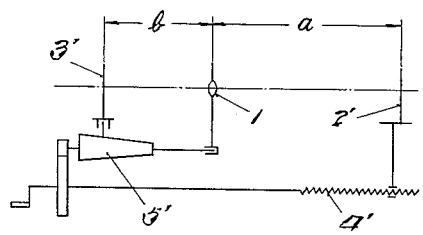
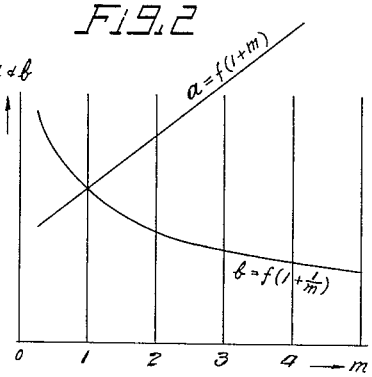
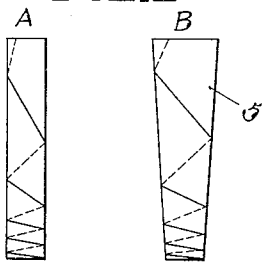
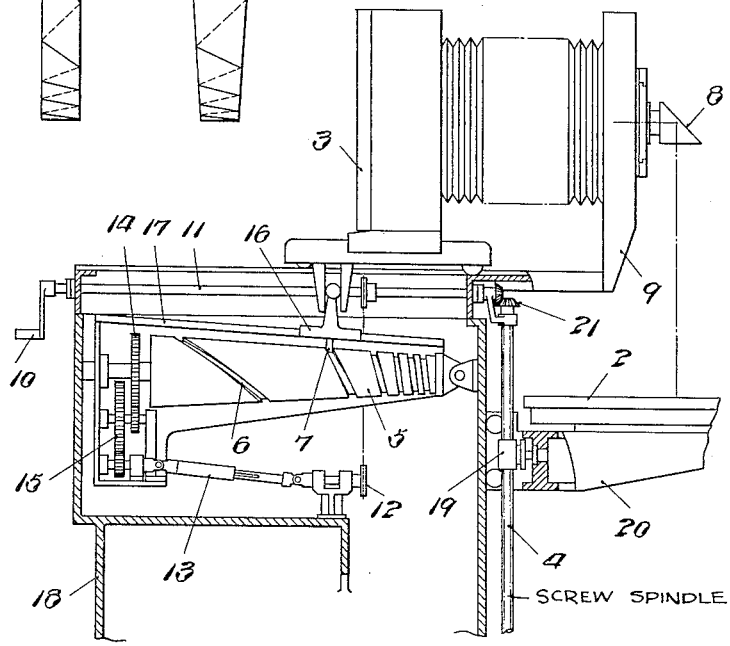
INVENTORS
TAKASHI OJI, HIROSHI IJIRI AND
  YUKIO NISHIKAWA
BY United States Patent Office 2,998,749
Patented Sept. 5, 1961

2,998,749
APPARATUS FOR FOCUSING A PROCESS CAMERA OR THE LIKE
Takashi Oji, Kita-ku, Kyoto, and Hiroshi Ijiri and Yukio Nishikawa, Sakyo-ku, Kyoto, Japan, assignors to Dainippon Screen Seizo Kabushiki Kaisha, Kamikyo-ku, Kyoto, Japan
Filed July 14, 1959, Ser. No. 826,966
Claims priority, application Japan Apr. 1, 1959
3 Claims. (Cl. 88—24)

This invention relates to an apparatus for focusing a process camera or the like, that is, a camera whose objective is made stationary while whose image plane is movable relatively to the objective.

Hitherto, in order to photograph an object with a desired magnification of an image by a camera of this kind, at first a movable support carrying the object relatively to the camera objective must be first adjusted and then a movable part of the camera carrying the image plane must be shifted relatively to the camera objective. Considerable difficulty is encountered and it requires great skill to focus the camera for any change in magnification of an image, because for an exactly focused condition of the camera a distance between the camera objective and the object to be photographed varies rectilinearly with change in magnification, whereas a corresponding distance between the camera objective and the camera image plane varies hyperbolically with change in magnification, as hereinafter explained in detail.

It is, therefore, the primary object of this invention to provide an apparatus for focusing a camera of this kind by which apparatus one can shift synchronously the object to be photographed as well as the image plane of the camera relatively to the camera objective into conjugate relative positions in accordance with magnification change. It is here to be understood that conjugate relative positions of the object and the image plane of the camera mean positions which the object and the image plane must occupy whenever an exactly focused condition of the camera is obtained at any value of magnification.

For this purpose the apparatus according to this invention comprises means for shifting the movable support carrying the object with a uniform pace, means for shifting the movable part of the camera carrying the image plane with a non-uniform pace varying with magnification change, and means interposed between the above mentioned two means for moving the latter two associatedly and synchronously.

Another object of this invention is to obtain a focusing apparatus for the camera of this kind which is easy and smooth in operation.

The accompanying drawing shows one embodiment of the apparatus according to this invention, wherein FIG. 1 is a skeleton view showing arrangement of a process camera with the apparatus embodying the present invention, FIG. 2 is a diagram showing characteristics of a process camera, FIG. 3 shows side views of two cams usable for the invention, and FIG. 4 shows a side elevation of the apparatus shown in FIG. 1, partly in section.

Referring to FIGS. 1 and 2, $a$ represents a distance between an object $2'$ to be photographed and the camera objective 1, while $b$ denotes a distance between the objective 1 and the camera image plane (focal plane) $3'$. In FIG. 2, $m$ denotes value of magnification while $f$ represents the focal length of the camera objective used. As shown in FIG. 2, for an exactly focused condition of the camera the distances $a$ and $b$ vary with change in magnification in such a manner that the former $a$ varies rectilinearly with $m$ while the latter $b$ varies hyperbolically with $m$. This means that for a determined value of $m$ the object has only to move always with a uniform pace, whereas the image plane has to move with a non-uniform pace varying in accordance with the formula $$b=f\left(1+\frac{1}{m}\right)$$

Now, assuming that equal distances 0–1, 1–2, 2–3, and so on in the diagram in FIG. 1 are equal to the circumference of a circle of a cylinder and that the curve $$b=f\left(1+\frac{1}{m}\right)$$

is plotted onto the circumference of the cylinder, there may be obtained a helix of a non-uniform pitch as shown in FIG. 3A. As $a=f(1+m)$ represents a straight line as shown in FIG. 2, this line can generate on the circumference of the same cylinder a helix of a uniform pitch, such as a screw thread. According to this principle, one can obtain on the circumference of a cylinder a helical groove of a non-uniform pitch varying in accordance with the formula $$b=f\left(1+\frac{1}{m}\right)$$

On the other hand, when a follower, such as a pin, is so inserted slidably into a helical groove on the circumference of a cylinder as to be moved rectilinearly by rotation of the cylinder, pressure or thrust imparted to the follower by the cylinder increases as the angle between the helical curve and the generating line of the cylinder decreases. When the diameter of the cylinder is made larger, this angle is increased. For this reason, it is preferable to use a cone instead of a cylinder for a helical groove of a non-uniform pitch, as shown in FIG. 3B. This conical cam, as shown in FIG. 3, has on its circumference a helical groove of a non-uniform pitch equal to that of the helical groove on the circumferences of the cylindrical cam shown in FIG. 3A. In the embodiment shown in FIG. 1 a conical cam $5'$ with a helical groove to be produced in such a manner as mentioned above is used for shifting the image plane $3'$ of the camera, while a screw spindle $4'$ is used for shifting the object $2'$.

Particularly speaking with reference to FIG. 4, a process camera 9 of a vertical type with a prism reflector 8 is fastened to a base or pedestal 18, in front of which a screw spindle 4 is arranged vertically to shift a movable support carrying an object 2 relatively to the camera objective through a nut 19 with a carriage 20. The screw spindle 4 is engaged through a bevel wheel gearing 21 with a horizontal rotating spindle 11 having a handle 10 at its free end. A conical cam 5 having a helical groove 6 is supported rotatably by the pedestal 18 with its horizontal center axis parallel to the center axis of the spindle 11. Into the helical groove 6 of the conical cam 5 a pin 7 of a follower 16 is inserted. The follower 16 carries the movable part 3 of the camera 9 carrying the image plane and can slide on and along a guide rail 17 fixed to the pedestal 18. The spindle 11 is so associated with the conical cam 5 through a belt-pulley transmission 12, an intermediate shaft 13, and a spur wheel gearing 15, as to be rotatable with a speed in a constant ratio to that of the cam 5.

In order to change magnification of an image, one rotates the handle 10, whereby the object 2 and the image plane 3 are shifted into their conjugate relative positions through the screw spindle 4 and the conical cam 5, respectively. According to the apparatus of this invention, the camera can be maintained always in its focused condition at any value of magnification.

From the foregoing it will be seen that many modifications of the specific disclosed form of the invention may be resorted to, and it is to be undersood that the scope of the invention is to be ascertained solely by the appended claims.

We claim:

1. An apparatus for focusing a process camera and the like comprising a base, a process camera fixed to said base, said camera having a movable part provided with an image plane, a guide rail fixed to said base, said movable part being slidably mounted on said guide rail, a vertically extending screw spindle journalled on said base, a movable support for carrying an object to be photographed, said movable support being movably mounted on said screw spindle, a horizontally extending spindle journalled in said base, bevel gear means interconnecting said horizontal spindle and said screw spindle so that rotation of said horizontal spindle will cause rotation of said screw spindle, a conical cam having a helical groove therein and journalled in said base, transmission means interconnecting said horizontal spindle and said conical cam and a follower secured to said movable part and engaging said conical cam in said helical groove so that upon rotation of said horizontal spindle said movable part and said movable support are simultaneously adjusted.

2. An apparatus according to claim 1, wherein said helical groove has a non-uniform pitch varying in accordance with a formula $$b = f\left(1 + \frac{1}{m}\right)$$

and said follower moves parallelly to the longitudinal center axis of said cam, where $b$ represents a distance between the objective of a camera used and said image plane of the camera, $f$ the focal length of the camera objective and $m$ magnification of the image.

3. An apparatus according to claim 1, wherein the direction of movement of said movable support intersects with that of said movable part.

References Cited in the file of this patent

UNITED STATES PATENTS

| 1,819,065 | Beidler | Aug. 18, 1931 |

FOREIGN PATENTS

| 756,321 | Great Britain | Sept. 5, 1956 |
| 975,149 | France | Oct. 11, 1950 |